(No Model.)
B. L. PECK.
MOTOR VEHICLE.
No. 595,203.  Patented Dec. 7, 1897.
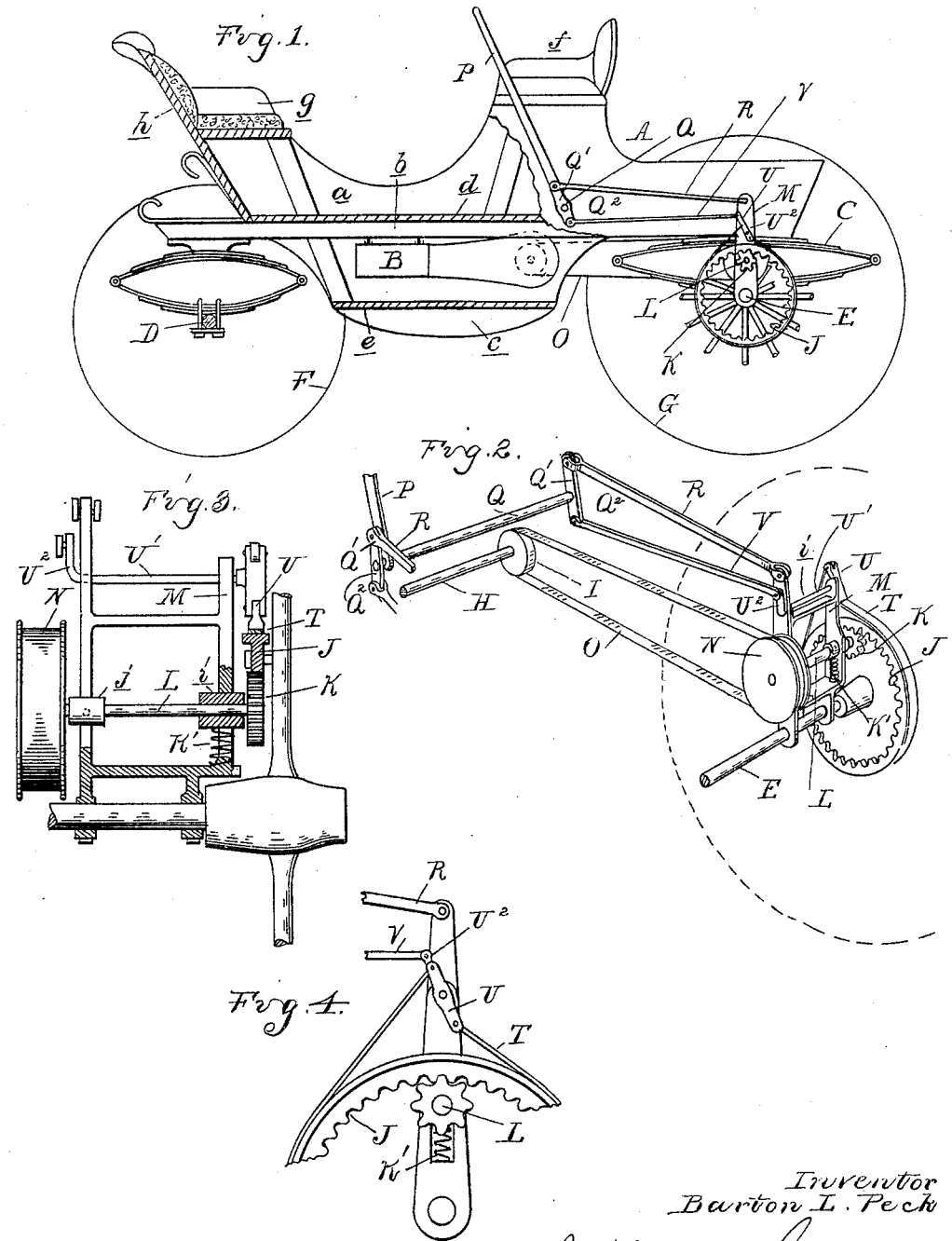
Inventor
Barton L. Peck
By *[signature]*
Atty's.
Witnesses
*[signature]*
*[signature]*

UNITED STATES PATENT OFFICE.

BARTON L. PECK, OF DETROIT, MICHIGAN.

MOTOR-VEHICLE.

SPECIFICATION forming part of Letters Patent No. 595,203, dated December 7, 1897.

Application filed March 24, 1897. Serial No. 628,955. (No model.)

*To all whom it may concern:*

Be it known that I, BARTON L. PECK, a citizen of the United States, residing at Detroit, in the county of Wayne and State of Michigan, have invented certain new and useful Improvements in Motor-Vehicles, of which the following is a specification, reference being had therein to the accompanying drawings.

The invention consists in certain features of construction, as hereinafter described and claimed.

In the drawings, Figure 1 is a longitudinal sectional elevation of my motor-vehicle. Fig. 2 is a perspective view of the drive mechanism, and Fig. 3 is a vertical section on the plane of the rear axle. Fig. 4 is an elevation of the brake mechanism.

A is the body of the vehicle, comprising the sides $a$, secured to the sills $b$ and having the central portion $c$ dropped below the sills.

$d$ is the floor of the body, and $e$ is a bottom board extending between the dropped portion $c$ of the sides and together therewith and the floor of the body forming an open-ended box, in which the motor, preferably a gas-engine B, is placed. The body is preferably provided with the central raised seat $f$ and the oppositely-facing front seat $g$, which is enough lower not to obstruct the view of the driver, who occupies the central seat.

$h$ is a front or dash board which inclines rearwardly from its upper to its lower end and forms a deflector, serving to direct the air-current formed by the forward movement of the vehicle through the open-ended motor-box.

The sills $b$ rest upon springs C, supported upon the forward and rear axles D and E, which are provided with wheels F and G, and a suitable steering-gear (not shown) is provided for the forward wheels.

For the motor B, I preferably employ a gas-engine of known type, and on account of the constant air circulation passing through the motor-box the engine is kept constantly in a cool state.

H is the motor-shaft, provided at each end with the pulleys I, from which motion is imparted to the rear wheels through connecting mechanism constructed as follows:

J are gear-wheels, preferably internal gears secured to the inner side of the wheels. K are pinions meshing with said gears secured to the shafts L, which are journaled in bearings $i$ and $j$ in the rock-frame M, which are pivoted to the axle. The bearing $i$ is slidingly secured in the frame M and is normally held in its outer position by the tension of a spring K', which permits the pinion K to move out of mesh with the gear J when sufficient pressure is exerted—as, for instance, if a stone should become lodged in the gear. The bearing $j$ is pivoted in the frame M to permit of this rocking movement of the shaft L.

N are pulleys in the shafts L in line with the pulleys I.

O are belts connecting the pulleys I and N.

P is a lever fulcrumed upon the body of the vehicle in a position to be under control of the driver, which lever has suitable connections with the rock-frame M, by means of which a movement in one direction of the lever will rock said frame rearward and tighten the belts, while a reverse movement of the lever will rock the rock-frame forward and release the belts.

The connection between the lever P and the rock-frame M preferably comprises the rock-shaft Q, to which the lever is attached, having rock-arms Q' at each end thereof which are connected by the rods R to the rock-frames M. The lever P also controls the brake mechanism, preferably comprising a brake-wheel, for which I employ the periphery of the internal gear-wheel J, the brake-strap T, surrounding said wheel and connected at its ends to the lever U, pivoted to the rock-frame M, and the rod V, connecting the lever U, through the medium of the rock-shaft U' and the rock-arm U², with a rock-arm Q² on the rock-shaft Q, all so arranged that the movement of the lever P to release the belts will at the same time rock the lever U and tighten the brake-strap around the wheel J. This brake mechanism may be applied to either one or both wheels, but preferably to both.

With the above-described connection the operator is enabled to start and stop the vehicle by the single lever P, which when moved in one direction rocks the frame M sufficiently to tighten the belts O on the pulleys I and N, and thus drive the rear wheel G, while a reverse movement of the lever will loosen the belts and apply the brake.

As before stated, the yielding bearing *i* permits the pinions K to disengage from the gears J in case anything becomes lodged in the gears, thereby preventing the stripping of the teeth.

What I claim as my invention is—

1. In a motor-vehicle, the combination with the body of the vehicle and the motor secured beneath the same, of a box surrounding said motor open at its forward and rear ends for the purpose described.

2. In a motor-vehicle, the combination with the body of the vehicle and the motor secured beneath the same, of a front or dash board for said body inclined rearward from top to bottom and the downward side extensions *c* and bottom *e* forming an open-ended box around said motor for the purpose described.

3. In a motor-vehicle, the combination with the drive-shaft, the driven wheel, and its axle, of a rock-frame pivoted on said axle, a shaft journaled in said rock-frame, having a gear connection with said wheel, and a belt connection with said drive-shaft, and means for rocking said frame to tighten or loosen the belt.

4. In a motor-vehicle the combination with the drive-shaft, the driven wheel and its axle, of a rock-frame pivoted to said axle, a shaft journaled in said rock-frame having a gear connection with said wheel and a belt connection to said drive-shaft, a brake for said wheel, and connections whereby said rock-shaft may be rocked in one direction to tighten said belt and when rocked in the opposite direction will apply the brake.

5. In a motor-vehicle, the combination with the drive-shaft and the driven wheel, of an intermediate shaft having a belt connection to said drive-shaft, and a gear connection to said wheel, and a yielding bearing in which said shaft is journaled permitting the gears under sufficient pressure to throw out of mesh.

6. In a motor-vehicle the combination with the drive-shaft, the driven wheel and its axle, of a rock-frame pivoted upon said axle, a shaft journaled in said rock-frame, having a pivoted bearing at its inner end, and a yielding spring-pressed bearing at its outer end, a pinion at the outer end of said shaft, meshing with a gear-wheel on said wheel, a pulley at the inner end of said shaft, a pulley on the drive-shaft, a belt connecting said pulleys and means for rocking said frame to tighten or loosen said belt.

7. In a motor-vehicle, the combination with the drive-shaft, the driven wheel and its axle, of a rock-frame pivoted to said axle, a shaft journaled in said rock-frame, having a belt connection with said drive-shaft, an internal gear-wheel secured to said driven wheel meshing with the pinion on said shaft, a brake-strap extending around the periphery of said internal gear, and connections between said brake-shaft and rock-frame and means for rocking the latter, whereby the rocking in one direction tightens the belt and in the opposite direction tightens the brake-strap.

8. In a motor-vehicle, the combination with the drive-shaft, the driven wheel and its axle, of a rock-frame pivoted to said axle, a shaft journaled in said rock-frame having a belt connection with said drive-shaft, an internal gear-wheel secured to said driven wheel meshing with the pinion on said shaft, a brake-strap extending around the periphery of said internal gear-wheel, a lever pivoted to said rock-frame to which the ends of said brake-strap are secured on the opposite sides of the fulcrum, a controlling-lever and connections between said controlling-lever and said rock-frame, and a lever pivoted thereto, whereby a movement in one direction will tighten the belt and in the opposite direction will apply the brake.

In testimony whereof I affix my signature in presence of two witnesses.

BARTON L. PECK.

Witnesses:
  M. B. O'DOGHERTY,
  OTTO F. BARTHEL.